(12) United States Patent
Liu (10) Patent No.: US 7,836,506 B2
(45) Date of Patent: Nov. 16, 2010

(54) THREAT PROTECTION NETWORK

(75) Inventor: Bing Liu, Rolling Hills, CA (US)

(73) Assignee: CyberDefender Corporation, Los Angeles, CA (US)

( * ) Notice: Subject to any disclaimer, the term of this patent is extended or adjusted under 35 U.S.C. 154(b) by 315 days.

(21) Appl. No.: 11/234,531

(22) Filed: Sep. 22, 2005

(65) Prior Publication Data

US 2006/0075504 A1    Apr. 6, 2006

Related U.S. Application Data

(60) Provisional application No. 60/522,374, filed on Sep. 22, 2004.

(51) Int. Cl.
  G06F 21/24  (2006.01)
  G06F 21/00  (2006.01)
(52) U.S. Cl. .............................. 726/25; 726/22; 726/23; 726/24; 726/26; 726/2; 713/187; 713/189
(58) Field of Classification Search ........................ None
  See application file for complete search history.

(56) References Cited

U.S. PATENT DOCUMENTS

| | | | |
|---|---|---|---|
| 5,590,199 A | | 12/1996 | Krajewski, Jr. et al. |
| 5,590,201 A | | 12/1996 | Lo |
| 5,848,233 A | | 12/1998 | Radia et al. |
| 5,956,481 A | * | 9/1999 | Walsh et al. .................. 726/23 |
| 6,026,502 A | * | 2/2000 | Wakayama .................. 714/38 |
| 6,038,848 A | | 3/2000 | Frutschi |
| 6,061,341 A | | 5/2000 | Andersson et al. |
| 6,073,178 A | | 6/2000 | Wong et al. |
| 6,202,070 B1 | * | 3/2001 | Nguyen et al. ..................... 1/1 |
| 6,654,882 B1 | | 11/2003 | Froutan et al. |
| 6,701,440 B1 | * | 3/2004 | Kim et al. ..................... 726/24 |
| 6,742,043 B1 | * | 5/2004 | Moussa et al. .............. 709/232 |
| 6,742,128 B1 | | 5/2004 | Joiner |

(Continued)

OTHER PUBLICATIONS

International Search Report for International Application No. PCT/US2005/034205, filed Sep. 22, 2005; Report completed Apr. 2, 2007, Report mailed Jun. 4, 2007, 2 pgs.

(Continued)

*Primary Examiner*—Syed A. Zia
(74) *Attorney, Agent, or Firm*—Christie, Parker & Hale, LLP (57) ABSTRACT

Threat protection networks are described. Embodiments of threat protection network in accordance with the invention use expert systems to determine the nature of potential threats to a remote computer. In several embodiments, a secure peer-to-peer network is used to rapidly distribute information concerning the nature of the potential threat through the threat protection network. One embodiment of the invention includes at least one client computer connected to a network, a server that stores threat definition data and is connected to the network, an expert system in communication with the server. In addition, the client computer is configured to refer potential threats to the server, the server is configured to refer to the expert system any potential threat forwarded by a client computer that is not identified in the threat definition data and the expert system is configured to determine whether the potential threat is an actual threat by exposing at least one test computer to the potential threat and observing the behavior of the test computer.

22 Claims, 9 Drawing Sheets

U.S. PATENT DOCUMENTS

| | | |
|---|---|---|
| 6,834,350 B1 | 12/2004 | Boroughs et al. |
| 6,898,715 B1* | 5/2005 | Smithson et al. ............... 726/24 |
| 6,976,167 B2 | 12/2005 | Nenashev |
| 6,978,093 B2 | 12/2005 | Clark |
| 6,985,800 B2 | 1/2006 | Rehtanz et al. |
| 7,036,146 B1 | 4/2006 | Goldsmith |
| 7,299,361 B1* | 11/2007 | Kim et al. .................... 713/188 |
| 7,343,624 B1* | 3/2008 | Rihn et al. .................... 726/24 |
| 7,383,578 B2* | 6/2008 | Blake et al. .................... 726/23 |
| 7,409,712 B1* | 8/2008 | Brooks et al. .................. 726/22 |
| 7,437,760 B2* | 10/2008 | Dettinger et al. ............... 726/24 |
| 7,437,761 B2* | 10/2008 | Takahashi ..................... 726/24 |
| 7,549,166 B2* | 6/2009 | Baffes et al. .................. 726/23 |
| 7,694,150 B1* | 4/2010 | Kirby ......................... 713/188 |
| 2002/0078381 A1 | 6/2002 | Farley et al. |
| 2002/0080964 A1* | 6/2002 | Stone et al. .................. 380/255 |
| 2002/0131123 A1 | 9/2002 | Clark |
| 2002/0131130 A1 | 9/2002 | Clark |
| 2002/0178373 A1* | 11/2002 | Altschul et al. .............. 713/200 |
| 2002/0188864 A1 | 12/2002 | Jackson |
| 2002/0199100 A1 | 12/2002 | Nenashev |
| 2002/0199116 A1* | 12/2002 | Hoene et al. .................. 713/201 |
| 2003/0056116 A1 | 3/2003 | Bunker, V et al. |
| 2003/0084318 A1 | 5/2003 | Schertz |
| 2003/0084331 A1 | 5/2003 | Dixon et al. |
| 2003/0084349 A1* | 5/2003 | Friedrichs et al. ........... 713/201 |
| 2003/0093514 A1 | 5/2003 | Valdes et al. |
| 2003/0110395 A1 | 6/2003 | Presotto et al. |
| 2003/0135762 A1 | 7/2003 | Macaulay |
| 2003/0204626 A1 | 10/2003 | Wheeler |
| 2003/0204632 A1 | 10/2003 | Willebeek-LeMair et al. |
| 2003/0204728 A1 | 10/2003 | Irwin |
| 2003/0217039 A1 | 11/2003 | Kurtz et al. |
| 2003/0219019 A1 | 11/2003 | Wilson |
| 2003/0236995 A1 | 12/2003 | Fretwell, Jr. |
| 2004/0003285 A1 | 1/2004 | Whelan et al. |
| 2004/0015728 A1 | 1/2004 | Cole et al. |
| 2004/0054917 A1 | 3/2004 | Obrecht et al. |
| 2004/0064736 A1 | 4/2004 | Obrecht et al. |
| 2004/0078384 A1 | 4/2004 | Keir et al. |
| 2004/0078592 A1* | 4/2004 | Fagone et al. ................ 713/201 |
| 2004/0090725 A1 | 5/2004 | Rehtanz et al. |
| 2004/0093513 A1 | 5/2004 | Cantrell et al. |
| 2004/0093514 A1* | 5/2004 | Piazza et al. ................. 713/201 |
| 2004/0098607 A1 | 5/2004 | Alagna et al. |
| 2004/0123157 A1 | 6/2004 | Alagna et al. |
| 2004/0162066 A1 | 8/2004 | Kuchibhotla et al. |
| 2004/0168173 A1* | 8/2004 | Cohen et al. ................. 719/310 |
| 2004/0187023 A1* | 9/2004 | Alagna et al. ............... 713/200 |
| 2004/0187024 A1 | 9/2004 | Briscoe et al. |
| 2004/0236547 A1 | 11/2004 | Rappaport et al. |
| 2004/0255167 A1* | 12/2004 | Knight ....................... 713/201 |
| 2005/0008004 A1 | 1/2005 | Williams |
| 2005/0028013 A1 | 2/2005 | Cantrell et al. |
| 2005/0044422 A1 | 2/2005 | Cantrell et al. |
| 2005/0050353 A1* | 3/2005 | Thiele et al. ................. 713/201 |
| 2005/0060562 A1 | 3/2005 | Bhattacharya et al. |
| 2005/0086102 A1 | 4/2005 | Harrison et al. |
| 2005/0132199 A1 | 6/2005 | Boroughs et al. |
| 2005/0177871 A1 | 8/2005 | Roesch et al. |
| 2005/0182949 A1 | 8/2005 | Phillips et al. |
| 2005/0182967 A1 | 8/2005 | Phillips et al. |
| 2005/0183138 A1 | 8/2005 | Phillips et al. |
| 2005/0228874 A1 | 10/2005 | Edgett et al. |
| 2005/0246767 A1 | 11/2005 | Fazal et al. |
| 2005/0262208 A1* | 11/2005 | Haviv et al. ................. 709/206 |
| 2006/0015935 A1 | 1/2006 | Dixon et al. |
| 2006/0019679 A1 | 1/2006 | Rappaport et al. |
| 2006/0031921 A1 | 2/2006 | Danforth et al. |
| 2006/0041497 A1 | 2/2006 | Huber |
| 2006/0062214 A1 | 3/2006 | Ng et al. |
| 2006/0075103 A1 | 4/2006 | Cromer et al. |
| 2006/0085858 A1 | 4/2006 | Noel et al. |
| 2006/0095965 A1 | 5/2006 | Phillips et al. |
| 2006/0100974 A1 | 5/2006 | Dieberger et al. |

OTHER PUBLICATIONS

Written Opinion for International Application No. PCT/US2005/034205, filed Sep. 22, 2005; Report completed Apr. 2, 2007, Report mailed Jun. 4, 2007, 3 pgs.

* cited by examiner

- 162 Threat definition data updated
- 164 Peer queries server to obtain information concerning update
- 166 Server notifies peer that update is available
- 168 Request update from remote peers
- 170 Remote peer possesses update?
  - No → 176 Peer seeks update directly from server
  - Yes → 172 Receive updated threat definition data from remote peer
- 174 Remote peer contacts server to verify reliability of updated data

FIG. 9

THREAT PROTECTION NETWORK

CROSS-REFERENCE TO RELATED APPLICATION(S)

This application claims the benefit of U.S. Provisional Patent Application No. 60/522,374, filed Sep. 22, 2004, the contents of which are expressly incorporated herein by reference in its entirety.

BACKGROUND

The present invention relates to detecting and protecting computers from threats that can be spread over a computer network and more specifically to the use of remote expert systems in threat protection.

Networks such as the Internet can enable rapid communication of information between computers. Unfortunately, the capability of computers to communicate is often used to victimize computer systems and/or their users. A variety of known threats exist that are spread using networks. One example of a threat is a computer virus. Computer viruses are programs that typically seek to reproduce themselves and can also modify and/or damage the lost computer system. Another threat to a computer user is Phishing. Phishing schemes (also known as carding and spoofing) typically seek to fraudulently acquire sensitive information, such as passwords and/or credit card details, by masquerading as a trustworthy person or business in an apparently official electronic communication, such as an email, a web page or an instant message. Another type of threat is Spam. Spamming is the sending of unsolicited email messages in bulk. Spam usually does not represent a significant risk to a computer, however, large volumes of Spam can congest networks, result in increased email server costs and reduce the efficiency of computer operators. Spyware is another type of threat. Spyware is a broad category of malicious software intended to intercept or take partial control of a computer's operation without the user's informed consent. While the term taken literally suggests software that surreptitiously monitors the user, it has come to refer more broadly to software that subverts the computer's operation for the benefit of a third party. Examples of Spyware include software designed to deliver unsolicited pop-up advertisements (often referred to as "adware"), software that steals personal information (often referred to as "stealware"). Spyware as a class of threat is very broad and is difficult to characterize. Although not always the case, Spyware typically does not seek to reproduce and in this regard are often distinct from viruses. Another type of threat is hijacking. There are generally considered to be two classes of hijacking. Client hijacking is a term used to describe a threat involving a piece of software installed on a user's computer to hijack a particular application such as a search. Examples of client hijacking include redirecting a user from a know website to another website or appending affiliate information to a web search to generate revenue for the hijacker. A second class of hijacking is referred to as server hijacking. Server hijacking involves software that hijacks a server and usually involves hijacking a web site. The server hijacking may involve a simple redirection or could be the redirection of results generated by a search engine. Yet another type of threat is automated hacking. Automated hacking typically involves a computer program that is installed on the computer. Once the program is installed the program will attempt to steal confidential information such as credit card numbers and passwords.

Computers can run software that is designed to detect threats and prevent them from causing harm to a computer or its operator. Often, threat signatures are used to identify threats. A threat signature is a characteristic of a threat that is unique and, therefore, distinguishes the threat from other potentially benign files or computer programs. A limitation of systems that use threat signatures to detect threats is that these systems do not, typically, possess a threat signature for a previously unknown threat. The lack of a threat signature can be overcome by attempting to identify a new threat as soon as it manifests itself. Once the threat is identified, a threat signature can be generated for the threat and the new threat signature distributed to all of the computers in the threat detection system. In the case of mass spreading threats (i.e. threats designed to spread to a large number of computers very rapidly), the number of computers that fall prey to the threat is typically dependent upon the time between the threat first manifesting itself and the distribution of a threat signature.

SUMMARY OF THE INVENTION

Embodiments of the threat protection networks are described. In many embodiments, clients generate threat signatures and compare them threat definition data. In the event that a potential threat is unknown, a client can refer the potential threat to a server. In several embodiments, the server compares the potential threat signature against its own copy of the threat definition data. When the server has no information concerning the nature of the potential threat, then the server can refer the potential threat to an expert system that is configured to determine the nature of the threat by exposing at least one test computer to the threat. In several embodiments, updated threat definition data can be distributed using a secure peer-to-peer network.

One embodiment of the invention includes at least one client computer connected to a network, a server that stores threat definition data and is connected to the network, an expert system in communication with the server. In addition, the client computer is configured to refer potential threats to the server, the server is configured to refer to the expert system any potential threat forwarded by a client computer that is not identified in the threat definition data and the expert system is configured to determine whether the potential threat is an actual threat by exposing at least one test computer to the potential threat and observing the behavior of the test computer.

In a further embodiment, the client is configured to generate a signature for each potential threat.

In another embodiment, the signature includes two or more check sums generated using a file associated with the potential threat.

In a still further embodiment, the server is configured to update the threat definition data based upon determinations made by the expert system.

In still another embodiment, the server is configured to notify clients that updated threat definition data is available.

In a yet further embodiment, the server and client computers form a secure peer-to-peer network and the updated threat definition data is distributed to client computers via the secure peer-to-peer network.

In yet another embodiment, the expert system includes multiple test computers.

In a further embodiment again, at least two of the test computers use different operating systems.

In another embodiment again, at least two of the test computers use different versions of the same operating system.

In a still further embodiment again, the expert system is configured to assign a score to a potential threat based upon predetermined criteria.

In still another embodiment again, the predetermined criteria are chosen such that an actual threat is likely to obtain a score above a first threshold.

In a yet further embodiment again, the determination of whether a potential threat is an actual threat by the expert system is automatic.

In yet another embodiment again, the expert system is configured to refer potential threats to an operator in circumstances where the expert system is incapable of conclusively determining the nature of the potential threat.

In a further additional embodiment, the expert system is configured to isolate itself prior to exposing the test computer to the potential threat.

Another additional embodiment, includes client software installed upon the computer. In addition, the client software is configured to monitor for predetermined behavior, the client software is configured to identify a source associated with the behavior, the client software is configured to generate a signature identifying the source and the signature includes at least two independent pieces of information generated using the source.

In a still further additional embodiment, the identified source is a file that includes a header and the signature includes a checksum generated using at least one bit from the file header.

In still another additional embodiment, the identified source is a file that includes a header and a body and the signature includes a checksum generated using at least one bit from a location within the file body.

In a yet further additional embodiment, the client software is configured to compare the signature to threat definition data and the client software is configured to obtain updated threat definition data via a secure peer-to-peer network.

Yet another additional embodiment also includes threat definition data stored on the computer. In addition, the client software is configured to provide the threat definition data to peer computers upon request.

In a further additional embodiment again, threat definition data stored on the server, a list stored on the server and verification information stored on the server. In addition, the list identifies a number of peer computers on which the threat definition data is also stored and the verification information can be generated by applying a predetermined algorithm to the threat definition data.

In another additional embodiment again, the server is configured to provide the list to a requesting computer upon request and the server is configured to add the identity of the requesting computer to the list.

In a still further additional embodiment again, the server is configured to remove a peer computer from the list as part of the addition of the requesting computer to the list.

In still another additional embodiment again, the server is configured to provide the verification information to requesting computer.

In a yet further additional embodiment again the server is configured to provide the threat definition data to a requesting computer.

In yet another additional embodiment again the server is configured to generate the verification data by applying the predetermined algorithm to the threat definition data.

A further additional embodiment includes an expert system installed on a host computer, and at least one test computer connected to the host computer. In addition, the expert system is configured to expose the test computer to the potential threat, the expert system is configured to observe the behavior of the test computer and the expert system determines a score based upon the observed behavior and a set of predetermined criteria.

In a still further additional embodiment, the expert system determines whether the potential threat is an actual threat based upon the score.

In a yet further additional embodiment, the expert system is configured to determine that a score above a first threshold constitutes a threat and a score below a second threshold constitutes no threat.

In a further additional embodiment again, the first threshold and second threshold have the same value.

In a still further additional embodiment again, the expert system is configured to refer potential threats to an operator that are assigned a score below the first threshold and above the second threshold.

In a yet further additional embodiment again, at least two of the test computers use different operating systems.

In a still yet further embodiment, at least two of the test computers use different versions of the same operating system.

In still yet another embodiment, the test computer is configured to operate in a simulated Internet environment during any exposure to a potential threat.

An embodiment of the method of the invention includes monitoring the operation of the computer for predetermined types of behavior, identifying the source of the predetermined behavior, determining whether the source is a potential threat, exposing a remote computer system to the potential threat, determining the nature of the potential threat using an expert system and responding to the potential threat based on its nature.

In a further embodiment of the method of the invention, the predetermined types of behavior include at least one of duplication of an executable file, creation of multiple threads, creation of files in system or shared directories, addition of auto-run entries to the operating system, attempting to automatically send e-mails to others that include attachments, connecting to a specific web site, opening a server port, blocking or disabling part of the system features or tasks and blocking firewall software.

In another embodiment of the method of the invention, determining whether the source is a potential threat includes generating a threat signature for the source of the predetermined behavior, comparing the threat signature to a white list to determine whether the threat signature is known to be safe, when the threat signature is not known to be safe, comparing the threat signature to a black list to determine whether the threat signature is known to be an actual threat and when the threat signature is not known to be safe or an actual threat, determining that the source of the predetermined behavior is a potential threat.

In a still further embodiment of the method of the invention, generating a threat signature includes generating at least two pieces of information concerning the source of the predetermined behavior using a predetermined algorithm.

In still another embodiment of the method of the invention generating a threat signature includes generating at least two check sums based on the source of the predetermined behavior.

In a yet further embodiment of the method of the invention, determining whether the source is a potential threat further includes sending the threat signature to a remote server, comparing the threat signature to an updated white list stored on the remote server to determine whether the threat signature is known to be safe, when the threat signature is not known to be safe, comparing the threat signature to an updated black list stored on the remote server to determine whether the threat signature is known to be an actual threat and when the threat signature is not known to be safe or an actual threat, determining that the source of the predetermined behavior is a potential threat.

In a further embodiment again of the method of the invention, at least two remote computers are exposed to the potential threat.

In another embodiment again of the method of the invention, at least two of the computers use different operating systems.

In a still further embodiment again of the method of the invention, at least two of the computers use different versions of the same operating system.

In still another embodiment again of the method of the invention, determining the nature of the potential threat using an expert system includes observing the behavior of the remote computers exposed to the threat and assigning a score to the predetermined threat based upon the observed behavior and a set of predetermined criteria.

In a yet further embodiment again of the method of the invention, determining the nature of the potential threat using an expert system further includes when the score exceeds a first threshold, determining that the potential threat is an actual threat and when the score is below a second threshold, determining that the potential threat is safe.

In yet another embodiment again of the method of the invention, determining the nature of the potential threat using an expert system further includes referring potential threats to an operator when the score is between the first and second thresholds.

A further additional embodiment of the method of the invention also includes distributing information concerning the potential threat to a number of computers.

In another additional embodiment of the method of the invention, distributing information concerning the potential threat to a number of computers includes distributing the information using a secure peer-to-peer network.

In a still further additional embodiment of the method of the invention, distributing information concerning a potential threat using a secure peer-to-peer network includes including the information in an update, receiving update requests from other peer computers, recording information concerning the identity of peer computers that have requested an update, providing the update to at least one peer computer and providing the peer computers with information identifying peer computers that have already downloaded the update.

In still another additional embodiment of the method of the invention, distributing information concerning a potential threat using a secure peer-to-peer network also includes receiving requests from at least one peer computer that have obtained the update for verification of the reliability of the update and providing information to the peer computer verifying the reliability of the update.

A yet further additional embodiment of the method of the invention also includes generating a simulated Internet environment. In addition, the remote computer exposed to the potential threat operates within the simulated Internet environment.

DETAILED DESCRIPTION OF THE INVENTION

Turning now to the drawings, embodiments of threat protection networks in accordance with the present invention are illustrated that include a number of computers and servers connected by a network. The computers run client software that is capable of protecting against at least some known threats and identifying other potential threats. In several embodiments, the type of threat detected is a virus. In many embodiments, the types of threats detected can include Phishing threats, Spam, Spyware, Hijacking threats, Automated Hacking threats or any other type of threat that is distributed via a computer network. In many embodiments, the client contacts a server and the server is able to direct the client to information concerning whether the potential threat is actually a threat. In several embodiments, the client refers the potential threat to a threat identification system. The threat identification system can determine whether the potential threat is an actual threat by exposing at least one computer to the threat and observing its behavior. The conclusion of the threat protection system can then be provided to a server, which distributes the information to all of the computers in the threat protection network. In many embodiments, the information is distributed using a secure distribution network such as the secure distribution networks described in U.S. patent application Ser. No. 11/233,868, entitled "SYSTEM FOR DISTRIBUTING INFORMATION USING A SECURE DISTRIBUTION NETWORK" and filed on Sep. 22, 2005, the disclosure of which is expressly incorporated by reference herein in its entirety.

Figure 1:
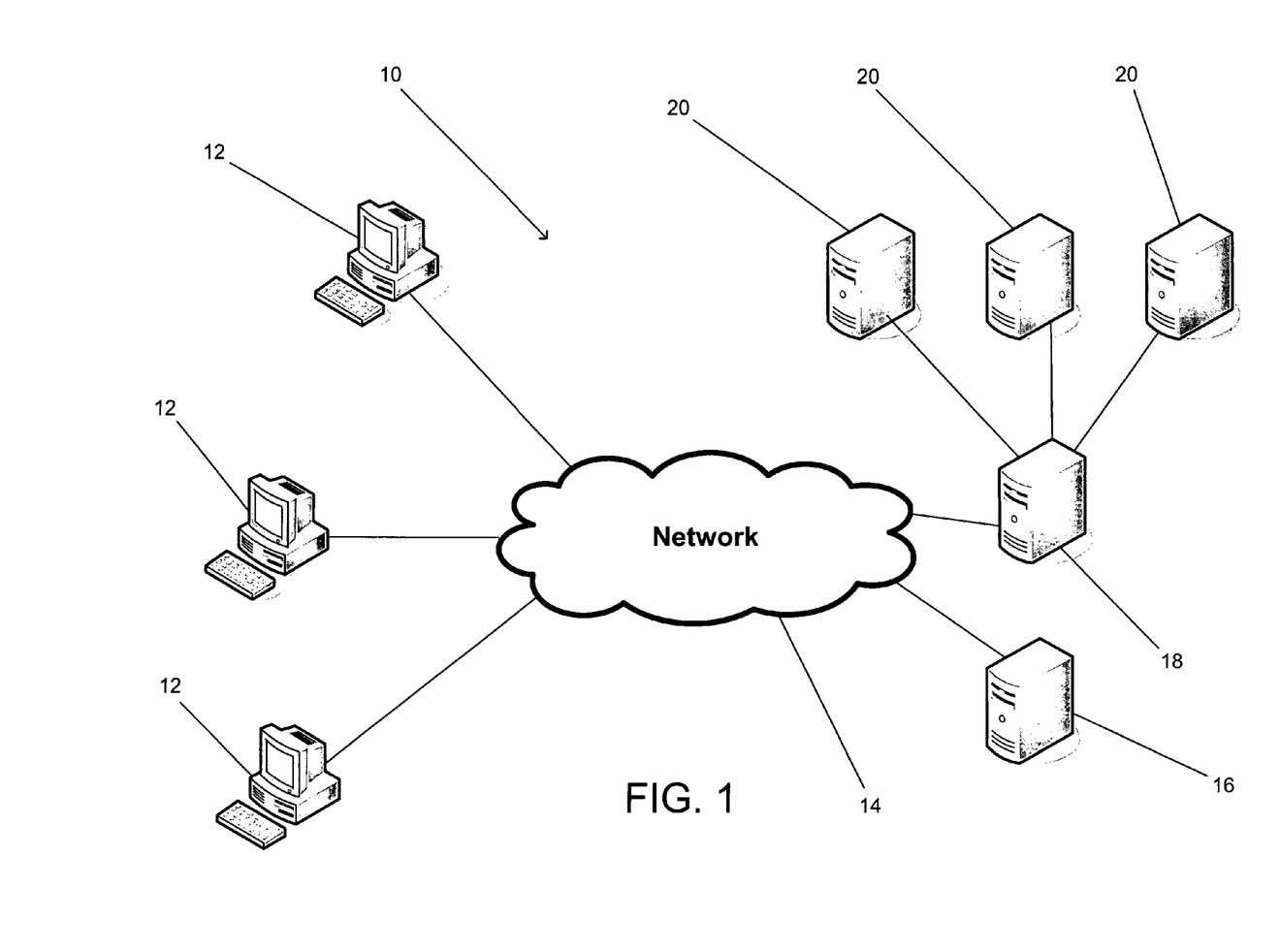
FIG. 1 is a schematic view of a threat protection network in accordance with an embodiment of the invention.

A threat protection network in accordance with an embodiment of the invention is shown in FIG. 1. The threat protection network 10 includes a number of computers 12 connected via a network 14, an alert server 16 and a threat identification system. In the illustrated embodiment, the threat identification system includes a threat identification server 18 that is connected to a number of isolated computers 20. Each of the isolated computers 20 can operate using a different operating system and the isolated computers, typically, can be isolated (i.e. prevented from sending information) to the broader network.

Client software is installed on each of the computers 12 and, during operation, the computers execute the client software as a background process. In many embodiments, the client software includes plug-ins for web browsers and email programs that monitor emails received by or websites viewed by a computer. As will be discussed further, the client software is designed to operate in conjunction with the other aspects of the threat protection network to protect each of the computers from one or more classes of threat. In many embodiments, the client software is capable of dealing with a number of known threats. When the client software encounters an unknown potential threat, the client can contact the alert server 16 for information concerning the potential threat. In the event that no information is known about the potential threat, then the client can refer the potential threat to the alert server 16.

The alert server 16 can possess information concerning the nature of a potential threat and provide the information concerning the nature of the threat directly to the computer 12 that referred the potential threat to the alert server. In the event the alert server 16 does not possess such information, the alert server 16 provides potential threats to the threat identification system, which exposes the isolated computers 20 to the potential threat and observes their behavior. In many embodiments, the isolated computers 20 operate within a simulated Internet environment. In this simulated environment, the computers behave as if they have full connectivity with the Internet and yet are incapable of communicating with other computers. Based upon the behavior of the isolated computers 20, the threat identification system can determine whether the potential threat is an actual threat. In many embodiments, this determination is made automatically using an expert system located on the threat identification server 18. Once a determination has been made, the alert server 16 can generate an update for distribution to the computers 12.

As discussed above, the computers and servers of a threat protection network in accordance with the present invention communicate via a network. In many embodiments, the network includes wired and/or wireless connections. In several embodiments, the network is a network of networks such as the Internet. In addition, many embodiments include open networks, however, other embodiments implement threat protection networks within a closed network.

In many embodiments, the alert server 16 and the computers 12 form a secure peer-to-peer network that facilitates dissemination of the update. A computer 12 can contact the alert server 16 to obtain information concerning peer computers that possess a desired update. The computer 12 can then contact the peers to obtain the update, the reliability of which can be verified with the alert server 16. In the event that the information is not available from a peer computer, the alert server 16 can provide the information directly to the computer 12. In several embodiments, some of the functions described above in relation to the alert server are performed by one or more update servers.

Figure 2:
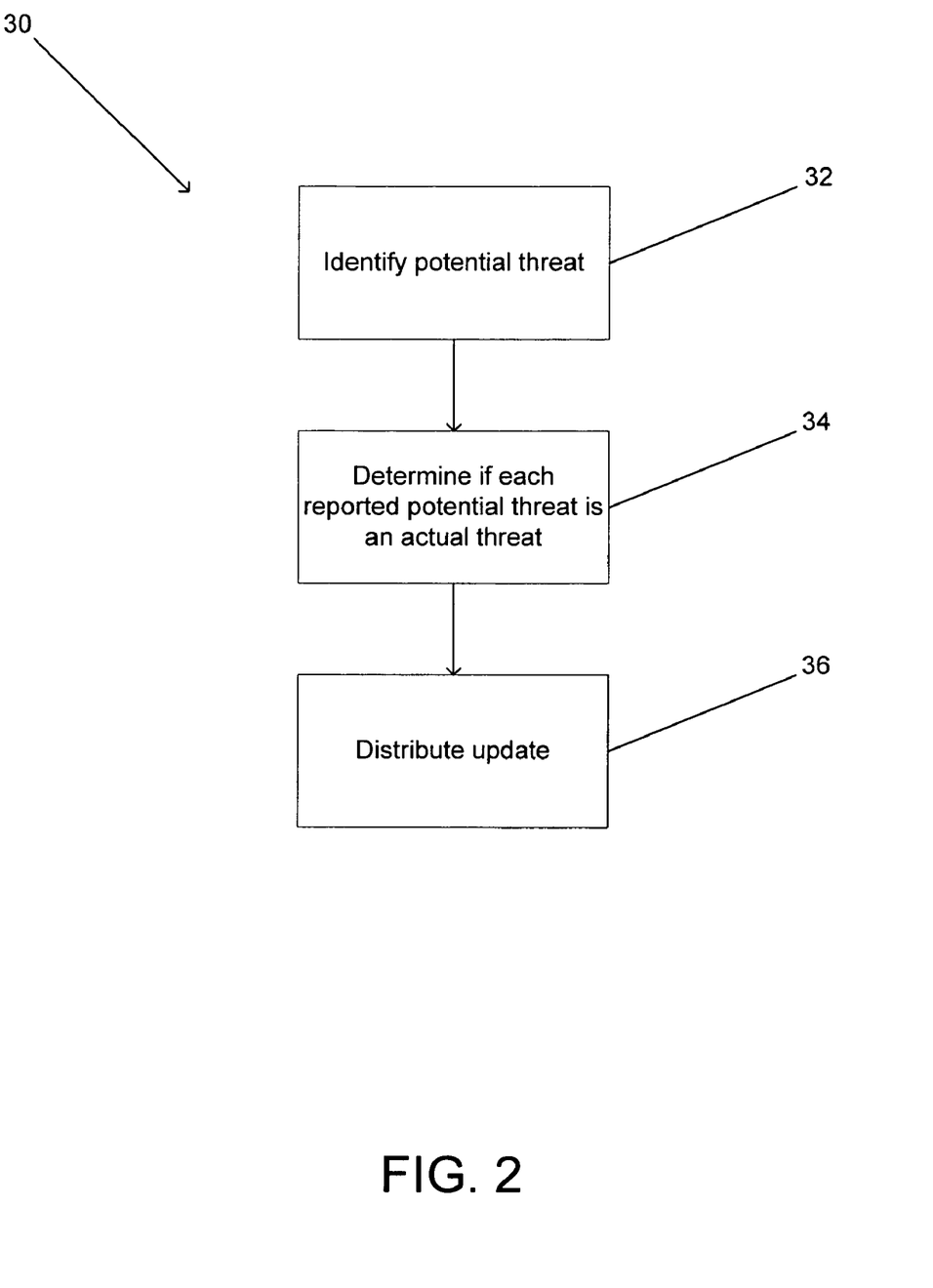
FIG. 2 is a flow chart showing a process for identifying threats and distributing threat signatures in accordance with an embodiment of the invention.

The manner in which various aspects of threat protection networks in accordance with the present invention can operate is depicted in FIGS. 2-9. Referring first to FIG. 2, a flow chart showing the basic operation of a threat protection network in accordance with the invention, when confronted with a previously unknown threat, is illustrated. The process 30 includes identifying (32) a potential threat, determining (34) if the reported potential threat is an actual threat and distributing (36) updated information concerning the potential threat to all of the computers in the threat protection network.

Figure 3:
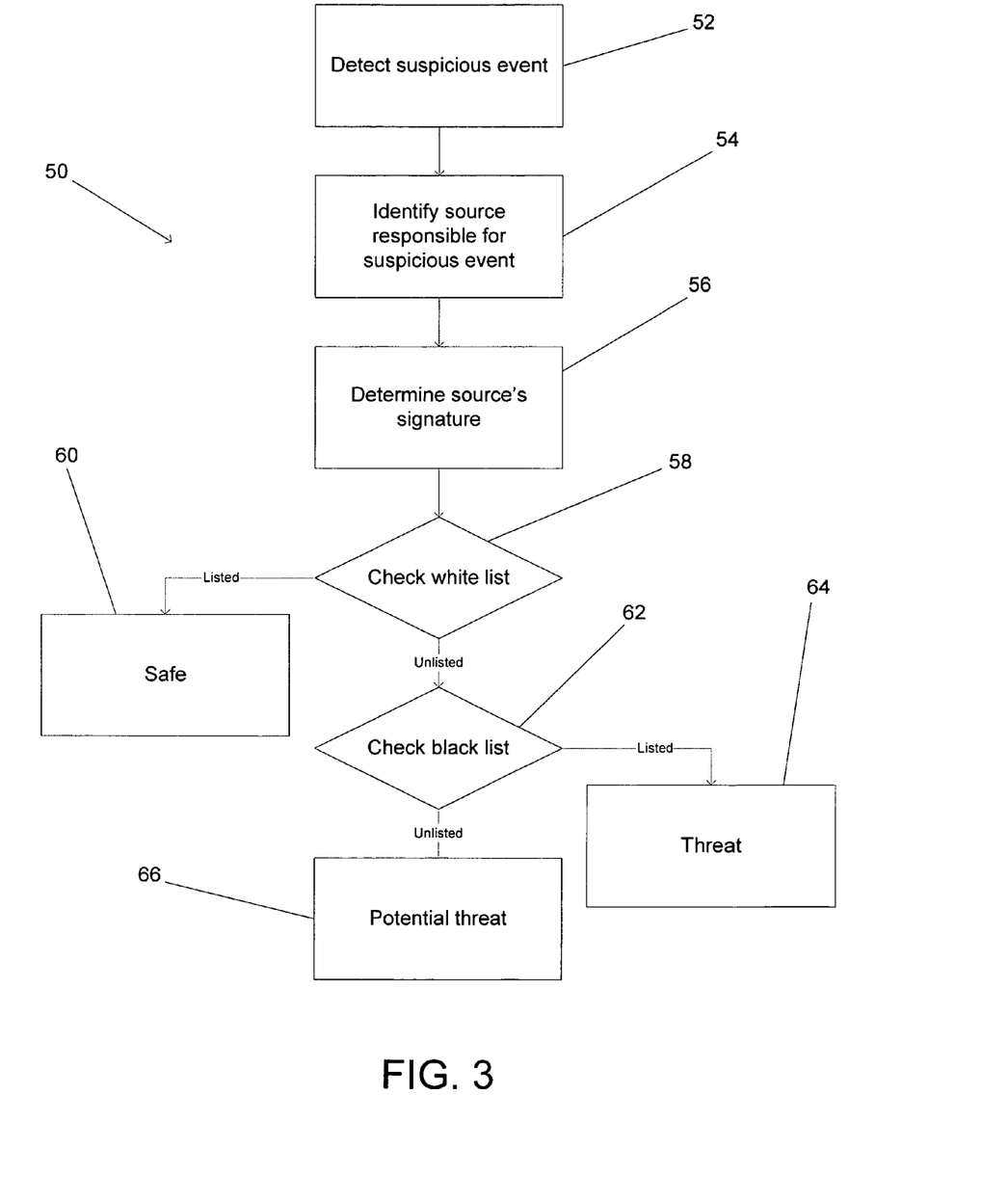
FIG. 3 is a flow chart showing a process for determining whether a signature is associated with a program that is safe, a potential threat or an actual threat in accordance with an embodiment of the invention.

A process for identifying a potential threat in accordance with an embodiment of the present invention is shown in FIG. 3. Typically, the process is invoked in circumstances where a suspicious event occurs. The characteristics of a suspicious event are discussed further below, but are typically activities that could be the precursor to harm such as the execution of a new program, the modification of the computer's operating system or configuration, receiving an email requesting personal financial information, viewing a particular website or being redirected to a website. The process (50) commences with the detection (52) of a suspicious event and includes determining (54) the source of the suspicious event. The source may be an executable file, the sender of an email, the host of a website or any other entity satisfying a set of predetermined criteria. Once the source of the suspicious event has been identified, a signature for the source is generated (56). A signature is one or more pieces of information that attempt to uniquely identify the source. The generation of a signature is discussed further below.

In order to ascertain whether the source is a threat, the signature is compared (58) to a white list that contains the signatures of sources that have been determined safe (60). When the signature is not present on the white list, the signature can be compared (62) to a black list. The black list contains the signatures of sources of suspicious events that have previously been identified as threats (64). When the source's signature is neither present on the black list or the white list, the process designates (66) the source to be a potential threat.

In the event that a source is determined (60) safe, the client can resume operation. In the event that a source is determined (64) to be a threat, the client can respond in a number of ways including notifying the user of the existence of the threat (e.g. a pop-up notification that an email is part of a Phishing scheme), deleting files or emails (e.g. deleting a virus program or Spam email) and any other actions that may be necessary to minimize the potential impact of any particular threat.

In some instances, a single client may be harmed prior to detection of a threat (e.g. the suspicious event was the act of personal information being stolen) and the client's major recourse is to notify the user of the harm. However, the detection of the harm can be communicated to other clients enabling them to protect against similar exposure and harm.

The process illustrated in FIG. 3 involves the detection (52) of a suspicious event. As mentioned previously, a suspicious event is typically an activity that could be the precursor to harm. Examples of suspicious events include the execution of a new program or a change in the settings of the operating system, such as an attempt to add a new program to the start up folder of a computer running the Windows® operating system manufactured by Microsoft Corporation of Redmond, Wash. Other types of suspicious events can be the receipt of e-mail requesting financial information, a program executing the background collecting information about a user, receipt of e-mail from an unknown e-mail address, visiting a particular website and/or viewing a website that attempts to modify the web browser being used to view the site. Although several examples of events that can be deemed suspicious are discussed herein, many other types of activities associated with threats can also be deemed suspicious in accordance with an embodiment of the present invention. The set of suspicious events can include any type of activity that is characteristic of any type of threat. Many embodiments of the present invention define a set of activities that are deemed suspicious and the set can be modified as new threats are identified. In many embodiments, the set is chosen to balance the need for protection against a requirement that minimal system resources be devoted to the detection of suspicious activities.

As discussed above, the determination of whether a source is safe, a threat or a potential threat in accordance with an embodiment of the present invention can involve generating a signature. A signature can be generated by determining a check sum based upon the bits of a file. In one embodiment, a single check sum is used based upon an entire file. In other embodiments, the signature is generated by determining more than one check sum. In many embodiments, check sums are determined using the bits of different regions of the file. In one embodiment, the signature includes a check sum generated using the bits of a program file's header. In another embodiment, the signature includes a check sum generated using bits from a randomly determined location within a file. Use of a signature that includes multiple check sums can decrease the likelihood that a threat file can be modified to avoid identification.

In several embodiments, the receipt of an email or the viewing of a website can be the source of the suspicious event. In many embodiments, the source of an email or website can be compared against white lists and black lists to determine whether the email or website constitutes a threat. In these embodiments, the signature of the source can be based upon the origin of the email or the location of the website. In one embodiment, the signature of the source of an email includes at least one of the mailer name or sender information associated with an email and the signature for the source of a website includes at least one of the IP address, domain name or specific URL path associated with a website. In several embodiments, the signature can also includes information derived using the bits of information that are used to represent the email or website.

The process illustrated in FIG. 3 demonstrates the use of signatures to determine the nature of a potential threat. In many embodiments, a client in accordance with an embodiment of the present invention can also determine the nature of a potential threat based upon the nature of the source and/or the initial suspicious activity. For example, a program that includes the double extension ".zip.exe" can automatically be determined to be a threat irrespective of whether a signature for the program is listed on the black list. In many embodiments, sources that do not pose a threat can obtain certification, which can be used to identify that the source does not pose a threat even if the source is not included on a white list.

Figure 4:
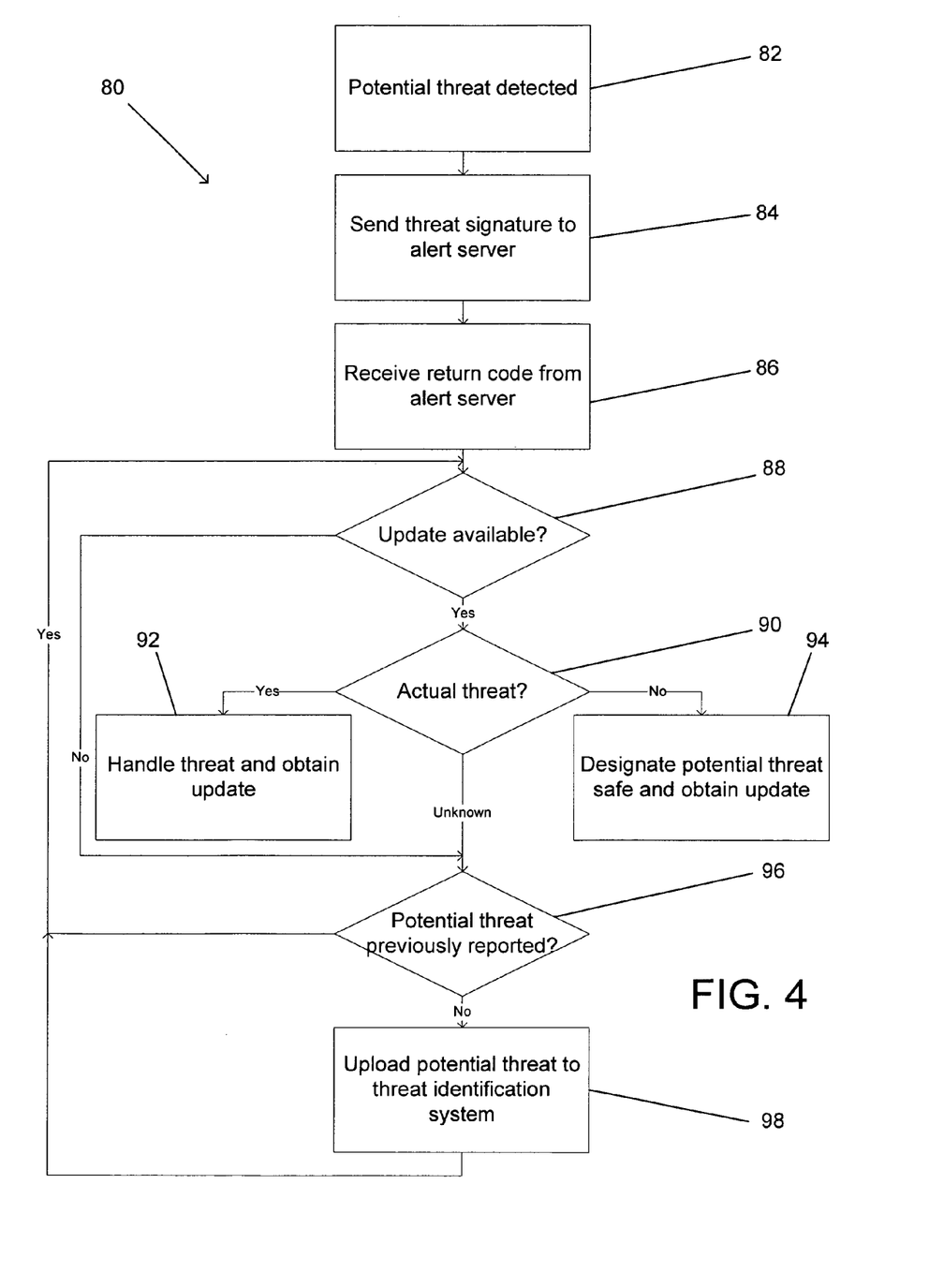
FIG. 4 is a flow chart showing a process that can be used by a client to communicate with a server to obtain information concerning a potential threat in accordance with the present invention.

When a program is determined to be a potential threat, then a client in accordance with an embodiment of the present invention can contact a server to obtain more information concerning the potential threat. A flow chart showing a process by which a client can obtain information concerning the nature of a potential threat in accordance with an embodiment of the present invention is illustrated in FIG. 4. The process 80 commences with the determination (82) of a potential threat. The signature of the potential threat is sent (84) to an alert server in order to obtain additional information about the threat. The alert server responds by sending a return code that is received (86) by the client. In one embodiment, the return code contains information concerning the latest update of threat definition data that has been distributed, information concerning whether the queried signature is associated with a known threat and a field indicating whether the potential threat should be referred to a threat identification system. In other embodiments, the server can provide other types of information relating to the potential threat.

If the client determines (88) that its threat definition data (i.e. the client's white list, black list and any other information used by the client in the identification of potential threats) is not up to date, then the client can commence obtaining the updated threat definition data. In addition, the client can inspect (90) the return code for information concerning whether the potential threat is an actual threat. In circumstances where the potential threat is a known threat, then the client can handle (92) the threat and obtain the updated threat definition data. When the potential threat is known to be safe, then the client removes (94) the block on the potential threat and obtains updated threat definition data.

When the client determines (88) that it has the most up to date threat definition data and/or the return code does not include information concerning the threat, then the client can inspect the return code to ascertain (96) whether the potential threat has previously been reported by another client. If the potential threat has been reported, then the client can wait for updated threat definition data to be made available by the alert server. If another client has not previously reported the potential threat, then the client can provide (98) a copy of the potential threat to the threat identification system. In many embodiments, the copy of the potential threat is provided to the alert server, which then forwards the copy to the threat identification system.

Figure 5:
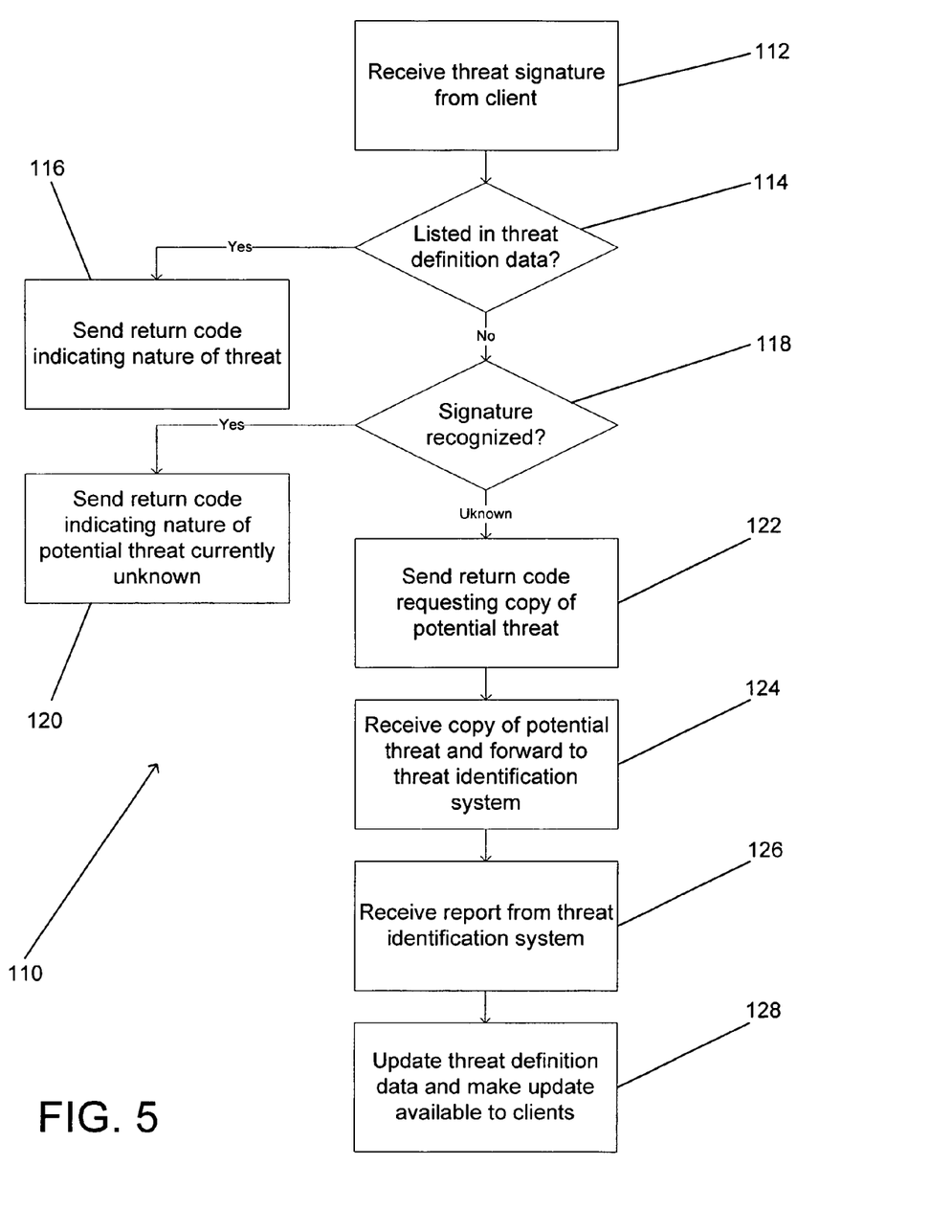
FIG. 5 is a flow chart showing the operation of a server in response to a request for additional information by a client in accordance with an embodiment of the invention.

A process that can be used by a server to respond to a request for information concerning a potential threat made by a client in accordance with an embodiment of the invention is shown in FIG. 5. The process 110 commences with the receipt (112) of a threat signature of a potential threat from a client. The server compares (114) the threat signature to the threat definition data. If the threat signature is listed in the threat definition data (the threat signature may be indicated as safe or as a threat), then the server sends (116) a return code that indicates the nature of the potential threat. In one embodiment, the return code includes information indicating the latest version of the threat definition data, whether the potential threat is safe or an actual threat and information indicating that a copy of the potential threat is required by the server. In many embodiments, enabling clients to obtain information concerning a potential threat at the time the information is required by the client can increase the likelihood that the threat protection network will minimize harm to the computer. Several embodiments also configure clients to regularly seek updated threat definition data, which can reduce the number of potential threats referred to the alert server by clients.

When the threat signature is not listed in the threat definition data, then a determination (118) is made as to whether another client has contacted the server in relation to a potential threat possessing the same threat signature. If another client has previously reported the threat signature, then a return code indicating that the potential threat has previously been reported and that its nature is not yet known can be sent (120). In one embodiment, the return code includes information identifying the latest version of the threat definition data, an indication that the nature of the potential threat is unknown and information informing the client that a copy of the potential threat is not required.

In the event that the server has not received any previous reports relating to the threat signature, the server can send (122) a return code that includes a request for a copy of the potential threat. In one embodiment the return code includes information indicating the latest version of the threat definition data, an indication that the nature of the potential threat is unknown and a request that a copy of the potential threat be forwarded to the server.

When a copy of the potential threat is received (124) by the server, the server forwards the copy to the threat identification system. The threat identification system generates a report concerning the potential threat, which is received (126) by the server, and the report is used by the server to create a new version of the threat definition data. In one embodiment, the new version of the threat definition data is created by taking the previous version and adding the threat signature to either the white list or black list depending upon the outcome of the report provided by the threat identification system. The server can then make (128) the new version of the threat definition data available for download. In many embodiments, the threat definition data is encrypted by the alert server and the verification information for the threat definition data enables the decryption of the threat definition data.

Figure 6:
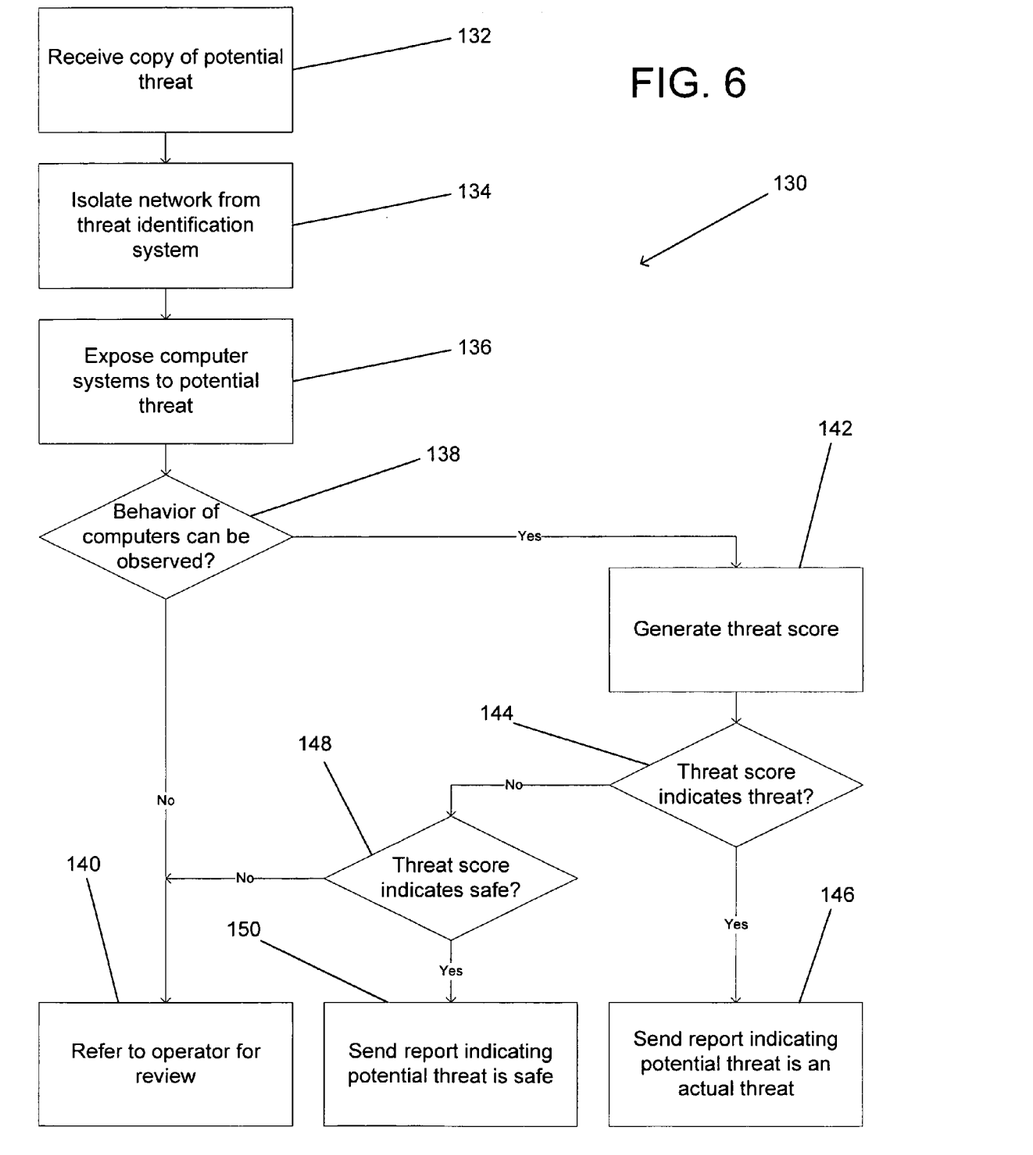
FIG. 6 is a flow chart showing the operation of a threat identification system in response to receiving a copy of a potential threat in accordance with an embodiment of the invention.

A process that can be used by a threat identification system to analyze a potential threat in accordance with an embodiment of the invention is shown in FIG. 6. The process 130 includes receiving (132) a copy of the potential threat. Once the copy of the threat is received, the threat identification system is isolated (134) from the network. In several embodiments, isolation is achieved by preventing the threat identification system from sending messages using the network. In one embodiment, the threat identification system is prevented from sending email by implementing a socket layer filter. In other embodiments, isolation is complete and involves the threat identification system neither sending nor receiving messages via the network.

Once the threat identification system has been isolated from the network, at least one computer can be exposed (136) to the potential threat. In many embodiments, multiple computers are exposed and in several embodiments a number of the computers are configured differently. For example, some embodiments include a number of computers running different operating systems and/or a number of computers running different versions of the same operating system. Although the computers are isolated from the network, many embodiments of threat identification systems in accordance with the present invention generate a simulated Internet environment that enables computers exposed to a threat to behave as they would if they were connected to an actual network. In addition, threats that involve the execution of software can be run in one or both of normal execution mode or debugging mode.

Once the computer(s) have been exposed to the potential threat, the behavior of the computers is observed. In the event that the computer is modified by exposure to the threat, the computer can be restored to an unmodified state upon the completion of observations. In one embodiment, a virtual twin of each computer is created prior to exposure that can be restored automatically by the threat identification system using software such as Shadow User Pro 2.0 manufactured by StorageCraft Technology Corp.—ShadowStor of Draper, Utah.

In many instances, activity of the computer(s) may not be capable of observation. When observation is not possible, the potential threat can be referred (140) to an operator. The operator can observe the nature of the potential threat using a debugging mode that enables the sequential observation of activities performed by a computer system exposed to the potential threat.

When the operation of the computer system can be observed, the threat identification system can use the observations to generate (142) a threat score. In one embodiment, the threat score is generated using an expert system that allocates score points in response to activities that are characteristic of sources constituting actual threats. The use of an expert system in identifying files constituting actual threats is discussed further below. Using the threat score, a determination (144) can be made as to whether the potential threat is an actual threat. If the potential threat is an actual threat, then the network connection can be enabled and a report sent (146) to the alert server indicating that the potential threat is an actual threat. The threat score can also enable a determination (148) of whether a potential threat is in fact safe, in which case a connection with the network can be established and a report sent (150) to the alert server indicating that the potential threat is safe. In some instances, the threat score may be ambiguous as to the nature of the potential threat. When the threat score does not indicate definitively the nature of the actual threat, then the potential threat can be referred (140) to an operator for review.

As discussed above, many embodiments of the present invention use expert systems to determine the nature of potential threats. In one embodiment, the expert system is located on the threat identification server 18. The expert system observes the operation of the various computers that have been exposed to the potential threat and awards scores based upon activities performed by the computers that are characteristic of exposure to an actual threat. Such activities can include duplication of the potential threat, creation of multiple threads, creation of files in system folders or shared folders, addition of auto-run entries into the computer's operating system, attempting to send e-mails to others that include the potential threat, connection to a specific web site, opening a server port, the fact the potential threat arrived as an email attachment, blocking or disabling part of the system features or specific tasks such as the "RegEdit.exe" or "TaskManager.exe", which are part of the Windows® XP operating system, blocking of firewall software, the nature of an email address, the nature of a domain name, requests and/or covert collection of information. In many embodiments, a set of factors are chosen and an embodiment of an expert system in accordance with the present system is developed by training the expert system using known threats. The training of the expert system can result in the allocation of scores to each of the factors that enable the determination of whether a previously unknown potential threat is an actual threat. In several embodiments, multiple expert systems are used that are each trained to identify a specific type of threat (e.g. virus, Phishing, Spam, Shareware, Hijacking, Automated Hacking or any other type of threat).

In many embodiments, a determination that a previously unknown potential threat is an actual threat is indicated by a threat score exceeding a predetermined threshold. In addition, a determination that the potential threat is safe is indicated by a threat score below a second threshold. In instances where the first and second threshold are not the same (an example where the thresholds are the same is discussed below), the possibility exists for a potential threat to obtain a threat score that is between the two thresholds. In this instance, the expert system cannot draw a definitive conclusion. Therefore, the expert system can refer the potential threat to an operator. The operator can analyze the potential threat and issue a report to the alert server. In instances where the potential threat is an actual threat, the operator can also identify new factors that should be considered by the expert system in response to what may constitute a new type of threat.

Figure 7:
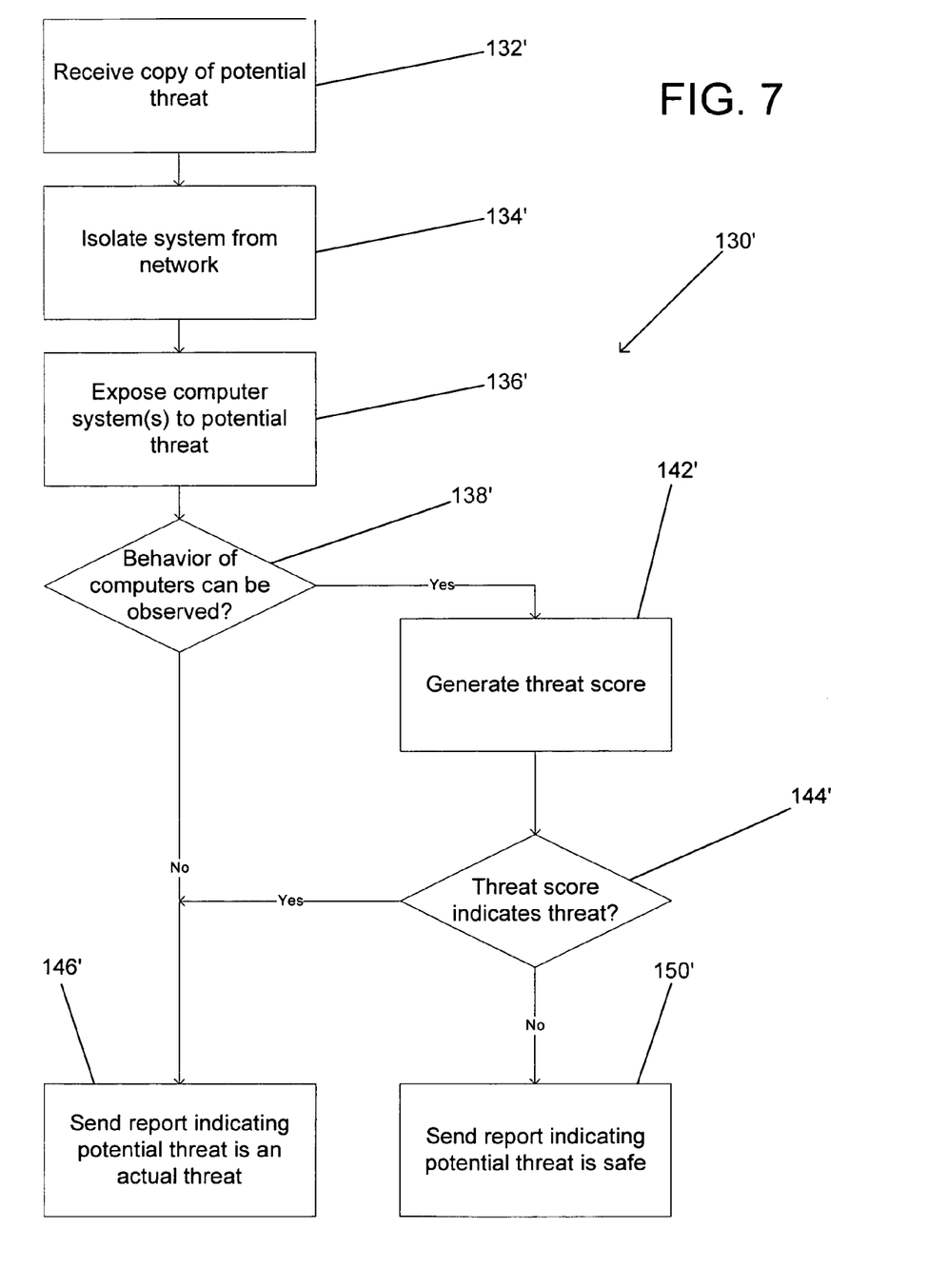
FIG. 7 is a flow chart showing the operation of a fully automated threat identification system in accordance with an embodiment of the invention.

As indicated above, an expert system may use a single threshold for determining whether a potential threat is an actual threat. Such systems can be fully automated, removing the need for an operator. A process that can be performed by an expert system that classifies potential threats automatically using a threat score generated by the expert system in accordance with an embodiment of the invention is shown in FIG. 7. The process 130' is similar to the process 130 shown in FIG. 6 with the exception that the potential threats that are referred to an operator in the process 130 are designated as threats in the process 130'.

Once a threat identification system has determined the nature of a potential threat and an alert server has generated updated threat definition data, clients can obtain the updated threat definition data. As discussed above, several embodiments of threat protection networks 10 in accordance with the present invention use secure peer-to-peer networks to distribute updated threat definition data to clients. Examples of secure peer-to-peer networks are described in the U.S. patent application entitled "SYSTEM FOR DISTRIBUTING INFORMATION USING A SECURE PEER-TO-PEER NETWORK", the disclosure of which is incorporated above by reference.

Figure 8:
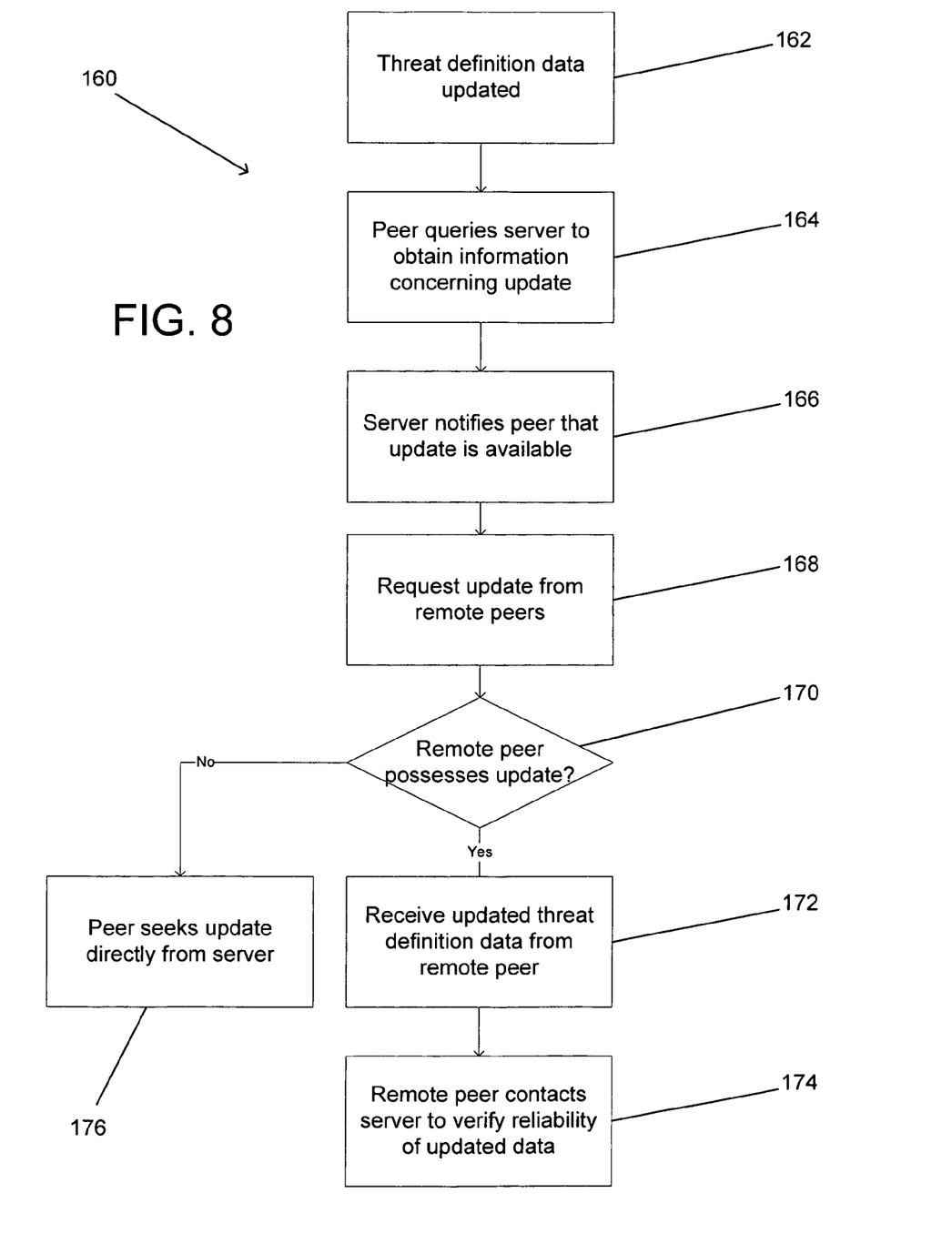
FIG. 8 is a flow chart showing a process for updating threat definition data via a secure peer-to-peer network in accordance with an embodiment of the invention.

A process by which a computer 12 can obtain updated threat definition data via a secure peer-to-peer network in accordance with an embodiment of the present invention is shown in FIG. 8. The process 160 commences when updated threat definition data is generated (162). At intermittent time intervals, computers contact the alert server inquiring (164) as to the existence of an update. In many embodiments, clients contact the alert server every four hours. In other embodiments, clients contact the alert server at other time intervals. The server notifies (166) the computer that an update is available and in several embodiments provides the computers with information indicating peer computers that have already obtained the updated threat definition data. The computer that contacted the server seeking the updated threat definition data can contact peer computers and request (168) that the peer computers provide the update.

The actions of the computer seeking the update are then determined (170) based upon whether any of the peers contacted by that computer possess the updated threat definition data. In the event that a peer computer includes the updated threat definition data, then the remote peer can provide (172) the update to the requesting computer. The requesting computer can then contact the server to verify the reliability of the update (174). In one embodiment the verification process involves obtaining one or more check sums from the server that can be compared with the updated threat definition data. In the event that none of the remote peers contacted by the computer possess updated threat definition data, then the computer can request (174) the data directly from the alert server.

Figure 9:
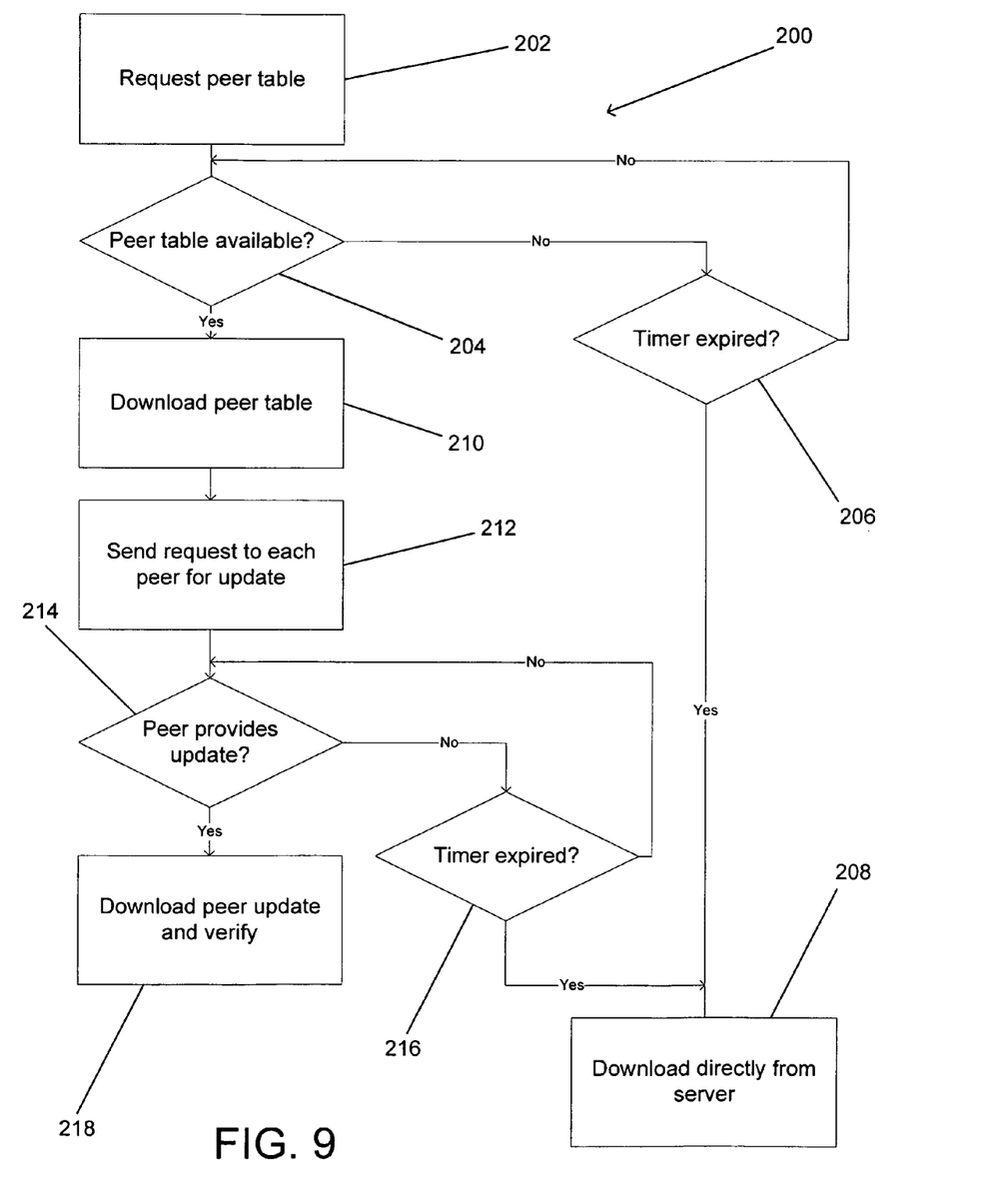
FIG. 9 is a flow chart showing another process for updating threat definition data via a secure peer-to-peer network in accordance with an embodiment of the invention.

Another embodiment of a process for obtaining updated threat definition data via a secure peer-to-peer network is shown in FIG. 9. The process 200 includes a peer requesting (202) a peer table from a server. The peer then sets a timer (204) and waits (206) for the server to provide a peer table. In the event that the server does not provide a peer table, then the peer can obtain (208) the update directly from the server.

When the server possesses a peer table, it can be downloaded (210) by the peer. In one embodiment, the peer table is limited to a small number of peers (e.g. 20) and the peer table does not include peers that are located behind a firewall. Once a peer has obtained a peer table from the server, the peer is added to the peer table and one peer is dropped from the peer table. In one embodiment, a FIFO process is used to select the peer that is dropped from the peer table and peers that are behind firewalls are not added to the peer table. In other embodiments, any variety of criteria can be used to select the peers that remain within the peer table including the bandwidth of the peer's connection to the network.

The downloaded peer table is used by the peer to request (212) updated threat definition data from each peer on the peer table. Once a request has been sent, the peer's actions are determined (214) based upon whether a peer is able to provide the update. Following the request, the peer sets (216) a timer and waits for a response from any of the remote peers. In the absence of a response, the peer obtains (214) the update directly from the server. When a remote peer can provide the updated definition data, then it is downloaded by the requesting peer and verified using information provided by the server.

While the above description contains many specific embodiments of the invention, these should not be construed as limitations on the scope of the invention, but rather as an example of one embodiment thereof. For example, the functions of the alert server can be performed by one or more servers. In addition, the threat protection network can include numerous mirrored servers. Furthermore, the threat protection network can include more than one expert system to analyze multiple threats simultaneously. In many embodiments, different expert systems can handle different types of threats. In one embodiment, separate expert systems exist for determining the nature of virus type potential threats, Phishing type potential threats, Spam type potential threats, Spyware type potential threats, hijacking type potential threats and automated hacking type potential threats. In other embodiments, expert systems are capable of determining the nature of multiple different types of potential threats. Furthermore, expert systems in accordance with the present invention can be deployed without any initial threat definition data and can be deployed in closed networks running proprietary software. An expert system trained in accordance with the present invention can rapidly build appropriate threat definition data in almost any type of networked environment. Accordingly, the scope of the invention should be determined not by the embodiments illustrated, but by the appended claims and their equivalents.

What is claimed is:

1. A threat protection network for detecting and analyzing suspicious files in real-time, comprising:
   at least one client computer connected to a network;
   a server that stores threat definition data and is connected to the network;
   an expert system in communication with the server;
   at least one test computer connected to the expert system;
   wherein the client computer is configured to identify a suspicious file on the client computer;
   wherein the client computer is configured to automatically notify the server of the suspicious file;
   wherein the server is configured to send the suspicious file to the expert system;
   wherein the expert system is configured to determine whether the suspicious file is an actual threat by exposing the at least one test computer to the suspicious file and analyzing the behavior of the suspicious file on the at least one test computer; and
   wherein the expert system is configured to isolate the expert system and the at least one test computer from the network prior to exposing the at least one test computer to the suspicious file by preventing any data from being sent to the network during the analysis of the behavior of the suspicious file on the at least one test computer.

2. The threat protection network of claim 1, wherein the client is configured to generate a signature for the suspicious file.

3. The threat protection network of claim 2, wherein the signature includes two or more check sums generated using the suspicious file.

4. The threat protection network of claim 1, wherein the server is configured to update the threat definition data based upon determinations made by the expert system.

5. The threat protection network of claim 4, wherein the server is configured to notify clients that updated threat definition data is available.

6. A threat protection network for detecting and analyzing suspicious files in real-time, comprising:
at least one client computer connected to a network;
a server that stores threat definition data and is connected to the network;
an expert system in communication with the server;
at least one test computer connected to the expert system;
wherein the client computer is configured to identify a suspicious file on the client computer;
wherein the client computer is configured to automatically notify the server of the suspicious file;
wherein the server is configured to send the suspicious file to the expert system;
wherein the expert system is configured to determine whether the suspicious file is an actual threat by exposing the at least one test computer to the suspicious file and analyzing the behavior of the suspicious file on the at least one test computer;
wherein the expert system is configured to isolate the expert system and the at least one test computer from the network prior to exposing the at least one test computer to the suspicious file;
wherein the server is configured to update the threat definition data based upon determinations made by the expert system;
wherein the server and client computers form a secure distribution network; and
wherein the updated threat definition data is distributed to client computers via the secure distribution network.

7. The threat protection network of claim 1, wherein the server is configured to:
receive a signature of the suspicious file from the client computer;
compare the signature with threat definition data comprising signatures of known threat files;
compare the signature with data comprising signatures of suspicious files reported from other client computers; and
if the signature is not found in the signatures of suspicious files reported from other client computers:
request a copy of the suspicious file; and
receive the suspicious file.

8. The threat protection network of claim 1:
wherein the at least one test computer includes multiple test computers;
wherein at least two of the test computers use different operating systems.

9. The threat protection network of claim 8, wherein at least two of the test computers use different versions of the same operating system.

10. The threat protection network of claim 1, wherein the expert system is configured to assign a score to a potential threat.

11. The threat protection network of claim 10, wherein a score above a first threshold is indicative of an actual threat.

12. The threat protection network of claim 1, wherein the determination of whether the suspicious file is an actual threat by the expert system is automatic.

13. A threat protection network for detecting and analyzing suspicious files in real-time, comprising:
at least one client computer connected to a network;
a server that stores threat definition data and is connected to the network;
an expert system in communication with the server; and
at least one test computer connected to the expert system;
wherein the client computer is configured to identify a suspicious file on the client computer;
wherein the client computer is configured to automatically notify the server of the suspicious file;
wherein the server is configured to send the suspicious file to the expert system;
wherein the expert system is configured to determine whether the suspicious file is an actual threat by exposing the at least one test computer to the suspicious file and analyzing the behavior of the suspicious file on the at least one test computer;
wherein the expert system is configured to isolate the expert system and the at least one test computer from the network prior to exposing the at least one test computer to the suspicious file; and
wherein the expert system is configured to refer the suspicious file to an operator in circumstances where the expert system is incapable of conclusively determining the nature of the suspicious file.

14. The computer of claim 2, wherein:
the identified file includes a header; and
the signature includes a checksum generated using at least one bit from the file header.

15. The computer of claim 2, wherein:
the identified file includes a header and a body; and
the signature includes a checksum generated using at least one bit from a location within the file body.

16. The computer of claim 2, wherein:
the client computer is configured to compare the signature to:
a first set of previously generated signatures to determine whether the source is safe; and
a second set of previously generated signatures to determine whether the source is a threat; and
the client computer is configured to obtain updated threat definition data via a secure distribution network.

17. A threat identification system configured to evaluate suspicious files discovered on a remote computer system, comprising:
an expert system installed on a host computer; and
at least one test computer connected to the host computer;
wherein the expert system is configured to receive a suspicious file from a server via a network;
wherein the expert system is configured to expose the at least one test computer to the suspicious file;
wherein the expert system is configured to analyze the behavior of the suspicious file on the at least one test computer;
wherein the expert system is configured to determine a score based upon the analyzed behavior and a set of predetermined criteria; and
wherein the expert system is configured to isolate the expert system and the at least one test computer from the network prior to exposing the at least one test computer to the suspicious file.

18. The threat identification system of claim 17, wherein the expert system determines whether the suspicious file is an actual threat based upon the score.

19. The threat identification system of claim 17, wherein the expert system is configured to determine that:

a score above a first threshold constitutes a threat; and
a score below a second threshold constitutes no threat.

20. The threat identification system of claim 19, wherein the first threshold and second threshold have the same value.

21. The threat identification system of claim 17, wherein at least two of the test computers use different operating systems.

22. The threat identification system of claim 17, wherein at least two of the test computers use different versions of the same operating system.

* * * * *